(12) United States Patent
Jorgensen

(10) Patent No.: US 8,439,184 B2
(45) Date of Patent: May 14, 2013

(54) HIGH SPEED ROOFING SHINGLE MAKING MACHINE INCLUDING CUTTER, CATCHER AND STACKER

(76) Inventor: Arne Roy Jorgensen, Barrington, IL (US)

( * ) Notice: Subject to any disclaimer, the term of this patent is extended or adjusted under 35 U.S.C. 154(b) by 536 days.

(21) Appl. No.: 12/459,092

(22) Filed: Jun. 27, 2009

(65) Prior Publication Data
US 2010/0040442 A1 Feb. 18, 2010

Related U.S. Application Data

(60) Provisional application No. 61/084,657, filed on Aug. 14, 2008.

(51) Int. Cl.
*B65G 15/12* (2006.01)

(52) U.S. Cl.
USPC .................. 198/626.1; 198/461.1; 198/461.2; 198/461.3; 198/626.2

(58) Field of Classification Search .............. 198/419.2, 198/461.1, 461.2, 461.3, 575, 576, 626.1, 198/626.2, 617, 817
See application file for complete search history.

(56) References Cited

U.S. PATENT DOCUMENTS

| | | | | |
|---|---|---|---|---|
| 4,124,128 A * | 11/1978 | Adams et al. | ............. | 414/788.3 |
| 4,913,415 A * | 4/1990 | Weber | ........................ | 271/272 |
| 5,039,082 A * | 8/1991 | Littleton | ..................... | 271/182 |
| 5,536,001 A * | 7/1996 | Lange et al. | ................... | 271/202 |
| 5,558,199 A * | 9/1996 | Roether et al. | ............. | 198/461.2 |
| 5,732,609 A * | 3/1998 | Marschke | ...................... | 83/92.1 |
| 6,237,912 B1 * | 5/2001 | Motooka et al. | ............. | 271/273 |
| 6,332,543 B1 * | 12/2001 | Niehues et al. | ................ | 209/539 |
| 6,443,448 B1 * | 9/2002 | Mohr et al. | .................... | 271/270 |
| 6,644,651 B2 * | 11/2003 | Allsup | ......................... | 271/184 |
| 6,708,813 B2 * | 3/2004 | Takahashi | ................. | 198/369.2 |
| 6,739,445 B2 * | 5/2004 | Armstrong | ..................... | 198/435 |
| 6,804,931 B2 * | 10/2004 | Pike | ................................ | 53/252 |
| 6,929,114 B1 * | 8/2005 | Smeathers et al. | ............ | 198/833 |
| 7,000,755 B2 * | 2/2006 | van Pinxteren et al. | ....... | 198/374 |
| 7,060,341 B2 * | 6/2006 | Mima et al. | .................... | 428/162 |
| 7,281,622 B2 * | 10/2007 | Qi | ............................... | 198/626.5 |
| 7,571,589 B2 * | 8/2009 | Shaw et al. | ..................... | 53/403 |
| 2003/0019719 A1 * | 1/2003 | Wiehler | | |

* cited by examiner

*Primary Examiner* — Douglas Hess

(57) ABSTRACT

The invention relates generally to a roofing shingle apparatus and more particularly to an improved such apparatus for high speed shingle making generally when handling a double shingle line (one line overlaid on the other with the high side of each line on opposite sides to make a single mostly even thickness) in a more compact arrangement from the cutter to the stackers and catchers, but not limited to a slower single line of shingle making that uses a flipper at the discharge of the catcher shuttle and not limited to a four wide overlaid to four thicknesses of shingles in one line and scissor cut, not described in detail herein, before entering a single line delivery belt section. The main purpose of this invention is to have control of the shingles coming off the cutter at a speed of up to two times the line speed of present machines, accelerate the shingle pack in a positive controlled manner for exact separation and without slowing down prior to the catchers, distribute the shingle packs to any one of four catchers for controlled stopping and feed the packs into respective stackers for distribution to the packaging machines.

6 Claims, 3 Drawing Sheets

ACCELERATION ROLLERS 7

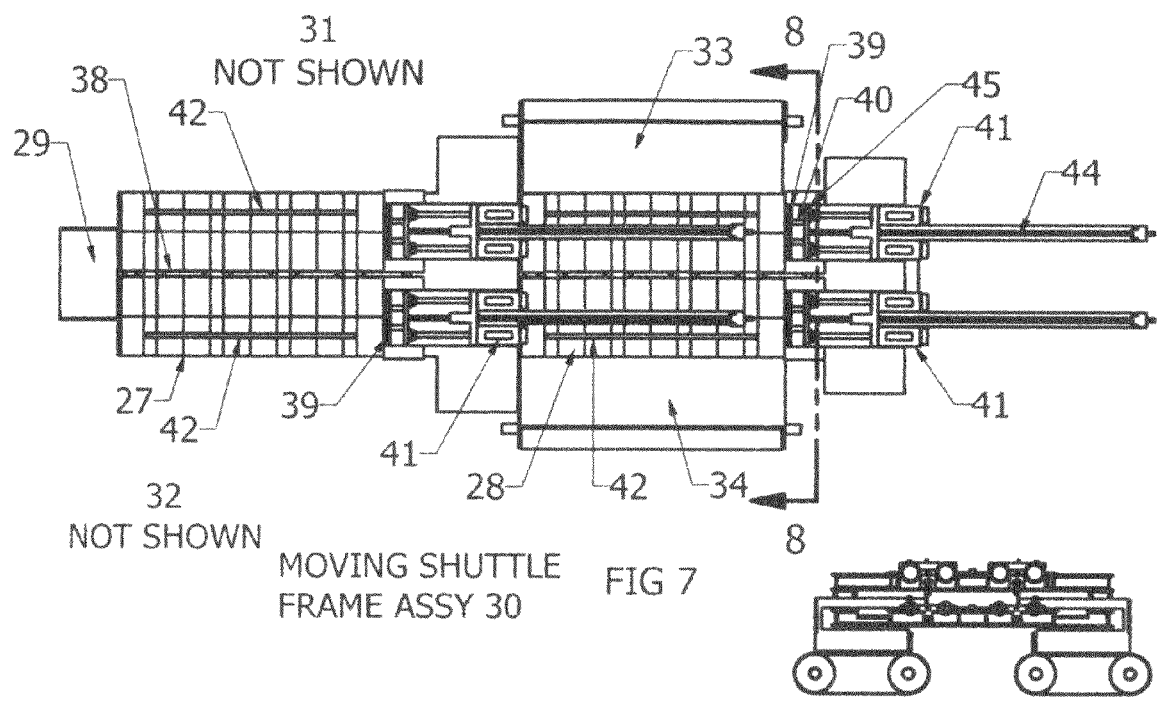
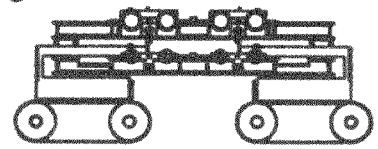
FIG 8
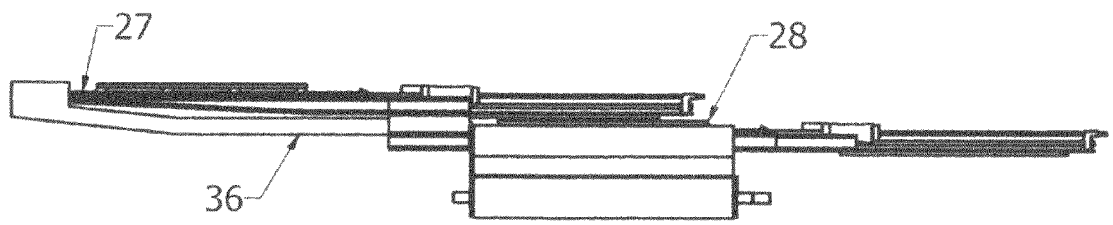
FIG 6

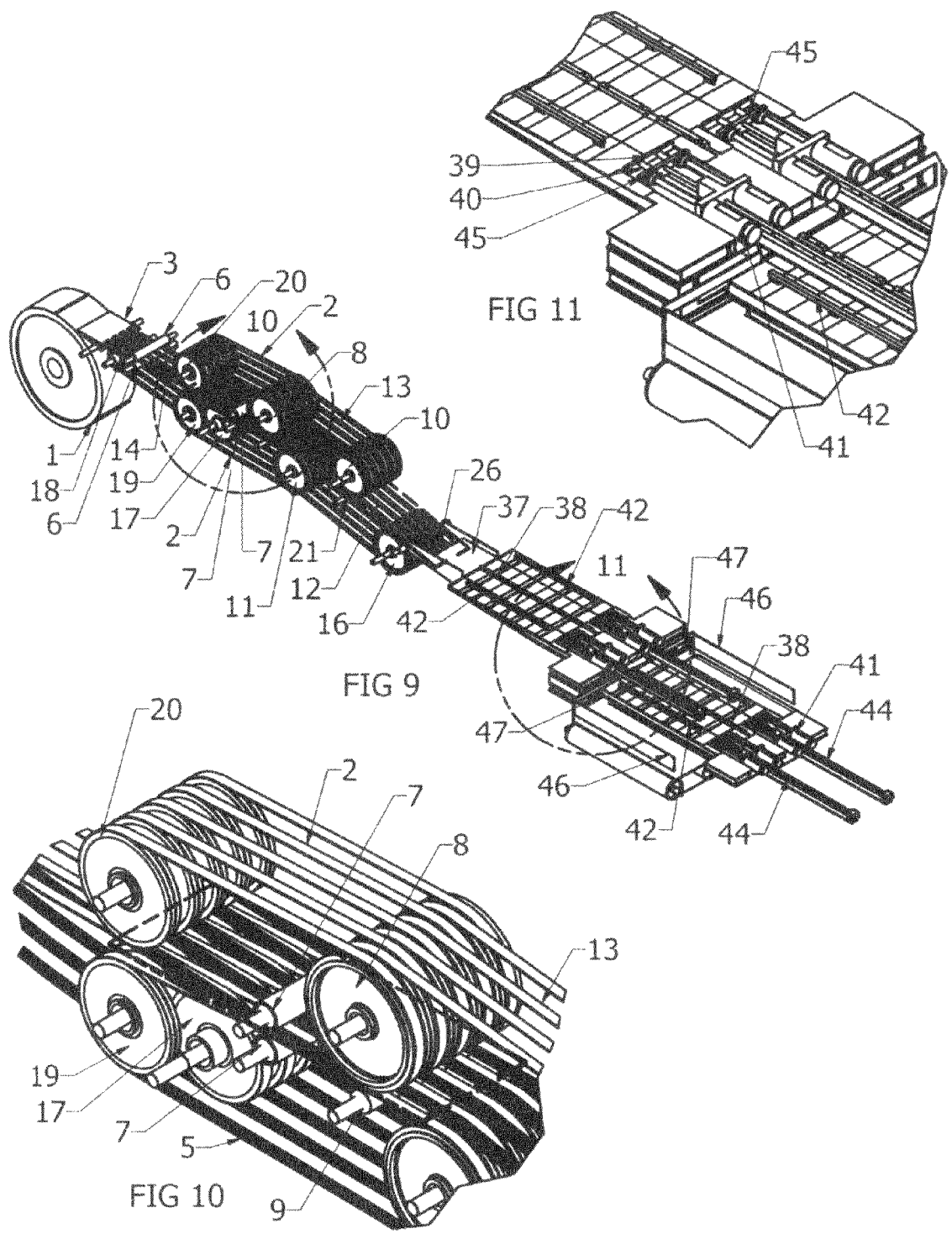

HIGH SPEED ROOFING SHINGLE MAKING MACHINE INCLUDING CUTTER, CATCHER AND STACKER

This application claims priority to provisional patent application Ser. No. 61/084,657 filed Aug. 14, 2008 to the extent allowed by law.

BACKGROUND OF THE INVENTION

Roofing shingles are formed continuously on an assembly line and need to be cut and stacked in bundles to be packaged and shipped for sale and use. One such stacking apparatus is shown at U.S. Pat. No. 4,124,128 wherein the shingles are passed along a top of a conveyor having a rise in the center thereof and then passed through a star wheel mechanism that flips every other shingle piece to provide a stack of shingles that is rectangular in structure. Since the time of this patent, shingles are now made double wide and split, then positioned in a vertical pair with a thin edge and thick edge of adjacent shingles juxtaposed for stacking rectangular polygon shape.

U.S. Pat. No. 6,390,766 discloses a shingle bundle palletizer with several conveyors. While some prior patents have allegedly disclosed conveyors that operate up to 900 feet per minute, it is typical that present day roofing machine conveyors operate at about 600 feet per minute. At 600 feet per minute, about 3.33 shingles per second for a 36 inch shingle or 300 milliseconds per shingle, are entering into an apparatus that feeds a pair of so-called catchers. The catchers receive, slow down and stop each shingle and position same, either in a stack, or provide for the depositing of each shingle vertically into a stack of such shingles.

Further, present day roofing machines can have a front end which is as much as 70 feet in length from the center of the cutter to the last of the catchers of a double width delivery belt machine.

A need has arisen, not only to increase the possible line speed and shingle construction rate in such machines, such as feeding four stackers from one line and providing a line speed of up to 1,200 feet per minute, but also to do so with a shorter length machine than heretofore known, such as an assembly of just 20 feet in length from the cutter to the last catcher stacker. Thus, not only would the production rate from such roofing machines be increased, but the building space necessary to house such machines may also be made smaller, or such added space used for other purposes.

A need has also developed to provide such a roofing machine catcher stacker that has fewer delivery belt motors, servo driven diverters and drives while providing a faster catcher stacker than heretofore known in the industry.

It is therefore an object of the present invention, generally stated, to provide a new and improved high speed roof shingle making machine catcher stacker having a controlled shingle separation from the cutter portion of such shingle making machinery.

Another object of the present invention is the provision of a roofing shingle machine which has line speeds of up to about 1,200 feet per minute (1,800 feet per minute into the catcher).

Another provision of the present invention is providing a roofing shingle machine catcher stacker that fits within a distance of about 20 feet from the shingle cutter to the last catcher stacker.

SUMMARY OF THE INVENTION

The invention is directed to an assembly for transporting roofing shingles between their production and their packaging. The assembly comprises an accelerator section including a plurality of lower belts for driving the shingles from a shingle cutter to a stacker area. A plurality of upper belts are positioned above the lower belts for holding down the shingles on the lower belts in air of shingle travel therealong. A pair of vertically oriented pinch rolls are positioned downstream of initial pulleys for the upper belts. The said lower belts are provided for accelerating the speed of the shingles passing through the assembly.

BRIEF DESCRIPTION OF THE DRAWINGS

The features of the present invention which are believed to be novel are set forth with particularity in the appended claims. The invention may best be understood from the following detailed description of a currently preferred embodiment thereof taken in conjunction with the accompanying drawings wherein like numerals refer to like parts, and in which:

FIG. 6 is a side elevational view of a high speed main shuttle stacker as it continues from the diverter shown in FIGS. 1-5;

FIG. 7 is a top plan view of the main shuttle stacker shown in FIG. 6;

FIG. 8 is an end elevational view of the main shuttle stacker shown in FIGS. 6-7

FIG. 9 is an orthographic view of the delivery and main shuttle stacker,

FIG. 10 is a blown up orthographic view of the main part of the delivery belt section.

FIG. 11 is a blown up orthographic section of the main part of the shuttle section.

DETAILED DESCRIPTION OF THE PREFERRED EMBODIMENT

Figure 1:
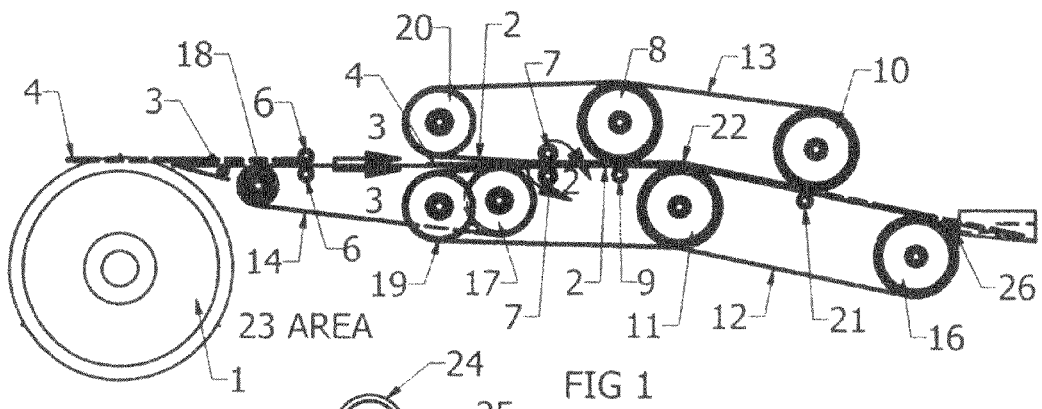
FIG. 1 is a side elevational view of the delivery assembly constructed in accordance with the present invention.

Referring to FIG. 1, a continuously made pair of double shingles (not shown) one on top of the other with their thick and thin sides reversed, passes over a cutter wheel 1 and, depending upon the diameter of the wheel, and depending on the diameter of the wheel, which has one, two or three cutters to cut shingles in lengths that may vary in this preferred embodiment between 36 and 41 inches. Thereafter, if the shingles pass quality control requirements prior to the cutter, they proceed into a series of acceleration belts 2, 5. If the shingles do not pass quality control standards, a lever mechanism rotate a scrap eject 3 upwardly and sends the pair of shingles 4 downwardly to a rejection receiving area 23. As the shingles come off the cutter and pass the scrap eject 3, they pass over the first of a pair of pinch rollers 6 where they maintain the same speed as coming off the cutter and then enter the acceleration rollers 7 and thereafter enter the first upper pulley 8 and the lower clamp roller 9.

Thereafter, it passes over bend pulley 11 in between a series of upper pulley assemblies 10 and lower pressure roller assemblies 21. The lower belts 12 maintain the path for each shingle passing there through. The upper belts 13 at position 22 are hold down belts 13 which maintain the shingles on the lower belts 12 at position 22 at the same line speed. Shingle spacing is determined after the shingle passes the pinch rollers 6 and reaches the acceleration rolls 7. The pinch rollers, driven by the take off belts 14 travel at essentially the same speed as the shingles coming off the cutter 1 but just a little bit faster to assure that the pinch roller's 6 pull on the shingle 4 sufficiently to separate the shingle cut but not provide a significant separation between the shingle still on the cutoff cylinder 1 and the shingle 4 traveling through the pinch rolls 6. While the shingle 4 is still contacting the pinch rollers 6, it reaches the acceleration rollers 7 and the belts 2 and at this point of contact, that portion or the belts 2 instantly takes on the speed of the shingle 4 and stretches the belts 2 like a rubber band between the acceleration rollers 7 and lower clamp roller 9 bearing against the upper pulleys 8. This stretches the belt and within about 1 inch brings the shingle up to the new speed such that the spacing of this shingle 4 and the next shingle 4 reaching the acceleration rollers 7 provide a predetermined spatial distance (about 20 inches) between horizontally adjacent shingles 4 as they approach the catcher stacker mechanism.

As shown in U.S. Pat. No. 4,124,128, the shingle conveyor system described therein has one set of belts to move the shingles into a catcher-stacker apparatus. Side guides maintain the individual shingles in proper orientation as they proceed to the stacker. In the apparatus, the upper pulley belts 13 at point 22 counteract the centrifugal force of the shingle movement as it is directed downward around the bend pulley 11 toward the catcher stacker mechanism.

Figure 4:
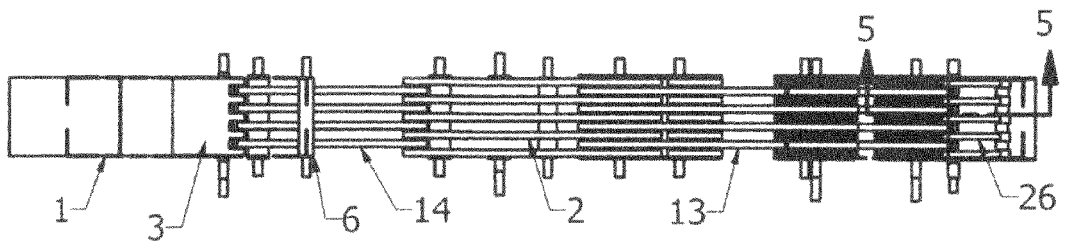
FIG. 4 is a top plan view of the delivery assembly shown in FIG. 1.
Figure 5:
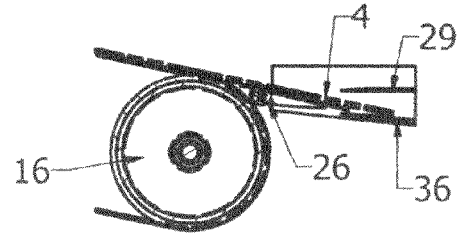
FIG. 5 is a fragmentary section detail view of a diverter shown in its lowered position.
Figure 3:
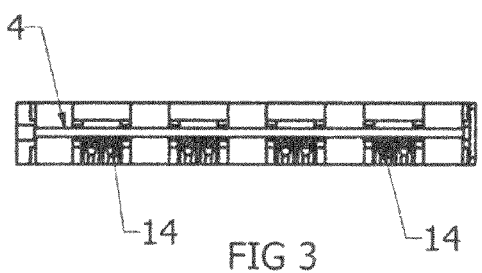
FIG. 3 is a section through the belts showing the edge of the shingle and a partial view of the pulleys.

Referring in more detail to FIGS. 1, 4 and 9, the acceleration pulley belt system includes three sets of pulley combinations having multiple polyurethane belts stretched there between. The first series of belts 14 adjacently downstream of the cutter wheel operate horizontally between two sets of pulleys 18 and pulley 17 and comprise, in the preferred embodiment, four evenly spaced apart polyurethane belts 14. The down stream pulley 17 is the drive for this set of belts 14.

The first set of pinch rolls 6 is positioned between the two pulleys 18 and 17 making up this first set of pulleys. This first set holds the shingle 4 onto the moving belts 14 at essentially the same speed as the cutter wheel 1 and leads the shingle into the next set of acceleration rollers 7 which is located between the upstream pulley 19 and middle pulleys 11 of a bottom set of five belts 5 and a top acceleration rollers 7 clamping the five upper belts 2 with the upper acceleration rollers 7 directly above the lower roller and between the upper tail pulley 20 and the hold down pulleys 8. The lower 5 and upper 2 sets of belts between the acceleration rollers 7 and clamp roller 9 act as rubber bands to accelerate the shingle when it leaves the pinch rollers 6 and accelerates through the acceleration rollers to provide shingle spacing.

This rubber band section between the acceleration rollers 7 and clamp roller 9 against the pulleys 8 provides the force to accelerate the shingle 4 to a higher speed in about 1 inch of travel. The gap increases between the higher speed shingle and lower speed shingle until the slower speed shingle anagoges the acceleration rollers 7. At that time the tail end of the first high speed shingle is at or past the third pressure roller 9 position and the rubber band action again accelerates the next shingle.

The bottom set of pulleys 19, 11, 16 and belts 2 comprise in this embodiment, a three pulley wheel set, not in a straight horizontal line, but with the middle pulley 11 slightly elevated horizontally from the starter or upstream tail pulley 19 and with the down stream drive pulley 16 set at an acute angle below the horizontal from a line joining the axes of the downstream and central pulley 11.

The plurality of polyurethane belts 5 in the lower set of pulleys 19 to 11 are five in number and evenly spaced apart such that the four polyurethane belts of the first set of pulleys 18, 17 and belt 14 combinations fit within the spaces between those five belts of the lower pulleys 19, 11. The upper set of hold down belts 2 and 13 are oriented with three pulleys 20, 8, 10 with the downstream pulley 10 being slightly lowered from the generally horizontal front drive and middle pulley 8. The initial upstream hold down pulley 8 is positioned above the clamp roller 9 to form the basis of stretching the belts between to the acceleration rollers 7. The upper belts 2 and 13 are driven by pulley 10 which is driven by a connecting drive belt or gear drive not shown from the motor driven pulley 16 which powers the lower belts 12 and 2 at the appropriate higher speed than the drive on pulley 17 that drives belts 14 such that the speed difference obtains a 20 inch spacing between shingles.

The middle upper pulley 8 and lower pulley 11 having grooves for nine total belts. The upper pulley 8 drives five belts through the upper acceleration roller 7 and the tail pulley 20 and bear directly above the five belts through of the lower acceleration roller 7 to the lower tail pulley 19. Upper pulley 8 is driven by four upper belts 13 that fit between the five belts 2 on the upper pulley 8 and driven by the pulley 10. Likewise the lower pulley 11 is driven by four lower belts 12 that fit between the five belts 2 on the lower pulley 11 and driven by pulley 16.

Figure 2:
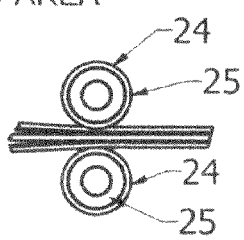
FIG. 2 is a blown up view of the acceleration rollers.

Referring to more detail to FIG. 2 shows a blow up of the acceleration roll 7 which consists of a low friction low inertia bearing 24 encompassing the heavier body 25 of the pressure roll assembly 7. This allows the pressure rolls 7 to apply a significant pressure to the shingle through the belts 2 such that the shingle 4 enters the nip between the belts 2 and 5 traveling at a higher speed than the lower speed of the shingle 4 coming off the cutter so when the molecules of the polyurethane belts 4 directly come into contact with the shingle 4 take on the lower speed while the bearing 24 having almost no inertia surrounding the roll 25 almost immediately assumes the slower speed of the shingle 4 and any tendency for the bearing 24 to rotate at a higher speed results in slippage of the bearing relative to the belts 4 and the roll 25 thus the pressure on that portion of the belt 14 will take on the slower speed of the shingle 4 and stretch the belt 14 between the acceleration roll 7 and the higher speed clamp roll 9.

One of the purposes of this invention is to minimize wear on the belts by avoiding slippage between the belts and shingle during the entire transportation of the shingle to the catchers. When the shingle is cut, it does not always continue its motion and if it hangs up for an instance during the cut, this is prevented by use of pinch rollers 6 that maintain a grip between the shingle 4 and belts 14 during the cut to make sure that the shingle maintains its motion during cutoff without any slippage on the belts 14. These pinch rollers 6 are adjustable to allow about one shingle length between the pinch rollers 6 and acceleration rollers 7.

The remaining belts 2, 12, 13 run at a speed greater than the first belts 14 so the shingles 4 are spaced at a 60 inch pitch, about 20 inches between shingles that are between 39 to 41 inches in length. In order to minimize slippage between the belts 14 and belts 2 and shingle 4, the tail pulleys 19 and 20 of the higher speed belts 2 are offset from the horizontal line of the shingle path of the slower speed belts 14 and reach the shingle path at the acceleration rollers 7. The shingle 4 traveling at the slower speed enters the acceleration rollers 7 at about the same time as it exits the pinch rollers 6. For this reason position of the pinch rollers 6 are adjustable to maintain about one shingle length between the pinch rollers 6 and acceleration rollers 7. This allows the machine can accommodate shingle lengths between 36 and 41 inches.

As the shingle enters the acceleration rollers 7, the mass of the belts 2 at an infinitely small pinch point instantly takes on the velocity of the slower speed shingle 4 while the rest of the high speed belts 12 inches downstream maintains the higher speed, thus stretching the belts over 12 inches in order to develop enough force to accelerate the shingle 4 to the higher speed in about 1 inch. The mass of the acceleration rollers 7 does not enter into the equation as these rollers 7 only apply a force and do not change speed because the outer ring of the rollers are made from a material with a low static coefficient of friction such as a form of Teflon. To accelerate a 9 pound shingle 4 from 240 in/sec to 360 in/sec with about 180 pounds of force will reach the new full speed in one inch of travel. In order to accommodate losing an inch during acceleration the 60 inch pitch (about 20 inches of space between shingles) can be kept by slightly increasing the belt speed and or increasing the distance between the pinch rollers and acceleration rollers (a little over one shingle length of 40 inches in this case).

Now the higher speed shingle 4 is traveling at about 1,800 fpm (360 in/sec) and is confined by the upper hold down belts 13 as it curves down to the diverter 26 which directs the shingle 4 to either the upper 27 or lower 28 shuttle sections referenced on FIG. 4. Sensors 29 (not shown) near the upstream shuttle detect the forward edge of the shingle to activate the diverter and check the register of the shingle 4 to the shuttle package 30 consisting of everything moving.

As shown most clearly in FIGS. 1 and 4, downstream adjacent the rearmost drive pulley 16 is a pivotal diverter guide 26 which, when in its up position, sends a shingle to a top pair of catcher 27 stackers 31 and 32 and when in its lower position sends the shingle to a bottom pair of catcher 28 stackers 33 and 34. The bottom pair of catcher stackers are shown in FIGS. 6-8.

Referring to FIGS. 6, 7 and 8, a catcher stacker mechanism includes a reciprocating scotch yoke or slide-crank mechanism shuttle drive 35, not shown, that reciprocates from side to side adjacent to the single upper 37, lower 36 guide chutes and a diverter 26 mechanism that moves shingles between an upper shuttle 37 and a lower shuttle 36. When the mechanism is reciprocated in one direction, the shingles are positioned on the moving left hand side of the center push bars 38, and when reciprocated in the other direction, are positioned with each shingle on the right hand side of the center push bars 38, thus providing for two shingle pathways for the upper shuttle 27 and two for the lower shuttle 28.

The diverter 26 diverts the shingle 4 either through the upper guide chute 29 to the upper shuttle 27 or through the lower guide chute 36 to the lower shuttle 28 sequentially. The lower shuttle 28 is one pitch length downstream from the upper shuttle 27. The angle of the downstream set of upper 13 and lower 12 belts direct the shingle onto the lower shuttle 28 through the chute 36 in a straight line. The diverter 26 moves quickly upward after the tail end of the shingle 4 passes the tip of the front end of the diverter 26. The diverter 26 is accelerated to its upper position by both a compressed spring 39 and the servo motor 40, both not shown. The spring 39 initiates the movement upward as there is some electronic delay in the action of the servo motor 40 which when full power is achieved continues the motion to the upward position. The spring 39 provides faster upward motion and causes slower downwards motion. With the diverter 26 in its up position, the downward action can begin when the shingle 4 is about one third to one half past the downstream tip of the diverter 26 into the upper shuttle 27. The diverter 26 can start its downward movement without affecting completion of the shingle's travel over the diverter 26. The diverter motor is the only motor in the assembly that is servo driven with preferably a 2000-13 hp motor.

The upper 27 and lower 28 shuttles act in unison as one body 30 driven by one large variable speed motor drive 35 synchronized as a function of the line speed to establish a shingle gap. The upper shuttle 27 is shown just downstream from the guide chute 29 which again is just downstream from the diverter guides 26. With the diverter guides 26 in the down position, a single shingle 4 moves down the guide chute 36 at high speed as the reciprocating shuttle assembly 30 reciprocates right and left. The shingle passes either to the left of the center push bars 38 or to the right of the center pushes bars 38.

Referring again to FIGS. 6, 7, 8 and 9, the lower shuttle 28 operates in the same manner as the upper shuttle 27 and reciprocates sideways as one shuttle assembly 30 to receive individual cut shingles 4 when the diverter guide 26 is in its lowered position. The shingle then moves down the lower portion of the guide chute 36 and either to the left of the center push bar 38 in the lower shuttle 28, or to the right of the center push bar 38 into the lower shuttle 28. As the lower shuttle reciprocates, the comb assemblies 42 lower on either side of the center push bars 38 strip the shingle off the shuttle 28 at the end of its reciprocating stroke and drop same onto the adjacent one of the stacker squaring belts 34.

The shuttle assembly 30 is driven by a scotch yoke or slide crank mechanism 35 driven by a variable speed motor (about 25 hp) synchronized with the speed of the delivery belts. The drive mechanism 35 moves the shuttle back and fort in a sinusoidal motion over a 20" stroke for a 13¼ inch wide shingle. The motion is timed so the center push bars 38 clear the front of the shingle 4 as it enters the either shuttle and reverses direction after the shuttle mechanism 35 comes to the end of the stroke. The mechanism 35 slows lateral shuttle movement at the ends of the stroke. The rear of the shingle 4 is completely in the either shuttle before the push bar 38 closes off the opening to the guide chute 29 or 36.

In the shuttle, the leading edge of the shingle first contacts the low mass impact bar 39 backed up by urethane springs 40 bearing against a rear support spring bar 45 that is designed so the combined momentum with the shingle 4 act as a single unit momentum traveling at a slower speed a short distance when contacting the high duty cycle shock absorbers 4 which absorbs over 90 percent of the energy when bringing the shingle to a stop. Behind the impact 39, the rear support spring bar 45 is a low spring rate spring 44 that smoothly returns the shingle 4, impact bar 39, urethane springs 40 and the rear support spring bar 45 to the starting position as the shock absorber 41 returns along with it. These shock absorbers and springs can be replaced with electronically controlled thrusters to provide the same action in a shorter distance.

As the shingle 4 has returned to its original linear entering position, the shuttle assembly 30 is nearing the end of the stroke whereupon the shingle 4 drops to the stacking conveyor 31, 32, 33 or 34 which then squares each shingle against a squaring bar 46 by the belt and the squaring bar 47 by a cylinder. After the appropriate number of shingles is loaded to each squaring conveyor, the squaring conveyor discharges the stack of shingles to a conveyor which takes the stack over to the packaging area.

Referring to FIGS. 6, 7 and 8 in more detail, the catcher stacker arrangement as shown has four catcher arrangement, two upper 31 and 32, not shown, and two lower 33 and 34. The two lower catchers 33 and 34 are shown in FIG. 8. In this embodiment, the stacker alignment belt shown is that in connection with the lower pair of catchers 33 and 34. A second such stacker alignment belts are also used in connection with the upper pair of shuttles and catchers, but are not shown herein to prove a less complex drawing and disclosure.

Thus, a new and improved roofing shingle machine catcher stacker assembly which controls the shingle separation from the cutter has been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed:

1. An assembly for transporting roofing shingles between their production and their packaging, the assembly comprising:
    an accelerator section including a plurality of lower belts for driving said shingles from a shingle cutter to a stacker area;
    a plurality of upper belts positioned above said lower belts for holding down said shingles on said lower belts for shingle travel therealong; and
    a pair of vertically oriented horizontal pinch rolls positioned downstream of initial pulleys for said lower belts that assure separation of the cut shingle from a cutoff cylinder and pulleys for said upper belts and said lower belts for accelerating the speed of said shingles passing through said assembly and
    a lower clamp roller bearing against a pulley that stretches the upper and lower belts between it and the acceleration rollers to accelerate the shingle in the acceleration rollers to a new speed.

2. An assembly for transporting roofing shingles between their production and their packaging, the assembly comprising:
    a pair of pinch rollers clamping the shingle to a lower belt at the speed of a cut off cylinder to assure a clean cut off,
    an accelerator section including a plurality of lower belts and upper belts located about one shingle length beyond said pair of pinch rollers operating at a greater speed for accelerating the shingle to a new speed and developing a space between shingles,
    a catcher stacker assembly for receiving and stacking roofing shingles, said assembly comprising, and driving said shingles from a shingle cutter to a stacker area,
    wherein said acceleration section continues to maintain positive control of the shingle a short distance, and including acceleration rollers of a lower mass and low coefficient of friction such that the shingle is pinched between the two belts such that said acceleration rollers apply a force without contributing to the inertia of the shingle.

3. A method of applying a force to a shingle without wear such that the shingle accelerates to a new speed in around 1 inch, the method comprising the steps of:
    compressing flexible belts and causing direct contact with the shingle to take on the speed of the shingle as it releases contact with pinch rollers traveling at the same line speed as a cut off cylinder,
    whereupon lower and upper belts between acceleration rollers and lower clamping roller against the upper belt pulley is traveling at a higher speed causing the belts between the clamped pulley and acceleration rollers to stretch and develop a force to accelerate the shingle to a new speed as it is released from pinch rollers;
    whereupon as the shingle reaches said new speed, the belts in front of the shingle shrink and belts upstream of said acceleration rollers contact the shingle at the acceleration rollers at said new speed to maintain said new speed of the shingle.

4. An upper and lower shuttle catcher that slows shingles to a controlled stop and simultaneously drops said shingles to two dual squaring and stacking conveyors before said shingles are further moved to standard packaging machines, said upper and lower catcher comprising:
    a stopping mechanism consisting of a lightweight low mass lightly spring loaded impact bar that absorbs some of the momentum of each shingle so the combined momentum of shingle and impact bar results in a slower velocity that shock absorbers can slow and return to a position where each shingle can be discharged to a squaring stacker conveyor.

5. The upper and lower shuttle catcher according to claim 4 further including a retractable comb for positively discharging the shingle and preventing the shingle from remaining on the shuttle as said comb retracts and positively lays the shingle on the stacker.

6. The upper and lower shuttle catcher as claimed in claim 4 further including a first mechanism for squaring each shingle after dropping same to one of the squaring and stacking conveyors by simultaneously reciprocating the conveyor back a fixed amount against a first stop in the plane of the upper shuttle catcher, and
    a second mechanism for squaring each shingle after dropping same to another of said squaring and stacking conveyors by simultaneously reciprocating said another conveyor back a fixed amount against a second stop in the plane of the lower shuttle catcher,
    whereupon when a given number of shingles are collected on each said squaring and stacking conveyors they are transferred by each said conveyor to the packaging machines.

* * * * *